United States Patent

Jackson

[11] Patent Number: 5,598,889
[45] Date of Patent: Feb. 4, 1997

[54] DEVICE FOR RECOVERING SOLID CLEANING MATERIALS CIRCULATING THROUGH A HEAT EXCHANGER

[75] Inventor: Philip Jackson, Paris, France

[73] Assignee: E. Beaudrey & Cie, Paris, France

[21] Appl. No.: 537,831

[22] PCT Filed: Feb. 21, 1995

[86] PCT No.: PCT/FR95/00199

§ 371 Date: Dec. 21, 1995

§ 102(e) Date: Dec. 21, 1995

[87] PCT Pub. No.: WO95/23321

PCT Pub. Date: Aug. 31, 1995

[30] Foreign Application Priority Data

Feb. 24, 1994 [FR] France .................. 94 02109

[51] Int. Cl.$^6$ ............... F28G 1/12; B08B 9/04
[52] U.S. Cl. .................. 165/95; 15/3.51
[58] Field of Search ............... 165/95; 15/3.51, 15/104.062

[56] References Cited

U.S. PATENT DOCUMENTS 4,234,993  11/1980  Kintner .................. 15/104.062
4,566,533  1/1986   Bochinski et al. ........ 165/95
5,137,081  8/1992   Klaren .................. 165/95

FOREIGN PATENT DOCUMENTS 2609644  7/1988  France .
3140803  4/1983  Germany .
8526836  1/1987  Germany .
4029437  5/1992  Germany .
 106399  6/1983  Japan .................. 165/95

Primary Examiner—Leonard R. Leo
Attorney, Agent, or Firm—Young & Thompson

[57] ABSTRACT

A recovery device comprising a sleeve (21) arranged in the outlet (15S) of a heat exchanger (10) and containing a filter assembly (24) capable of retaining solid cleaning materials (18) circulating through the heat exchanger. The filter assembly (24) comprises a rotary member (25) with a filter panel (26) and two interconnected pipes (27S, 27E) arranged on either side of the rotary member (25) in connection with the relative rotation thereof, as well as a circulation assembly for locally generating a counter-flow through the filter panel (26) of the rotary member (25) opposite the pipes (27S, 27E). The device is particularly useful in tubular heat exchangers used in condensers.

9 Claims, 2 Drawing Sheets

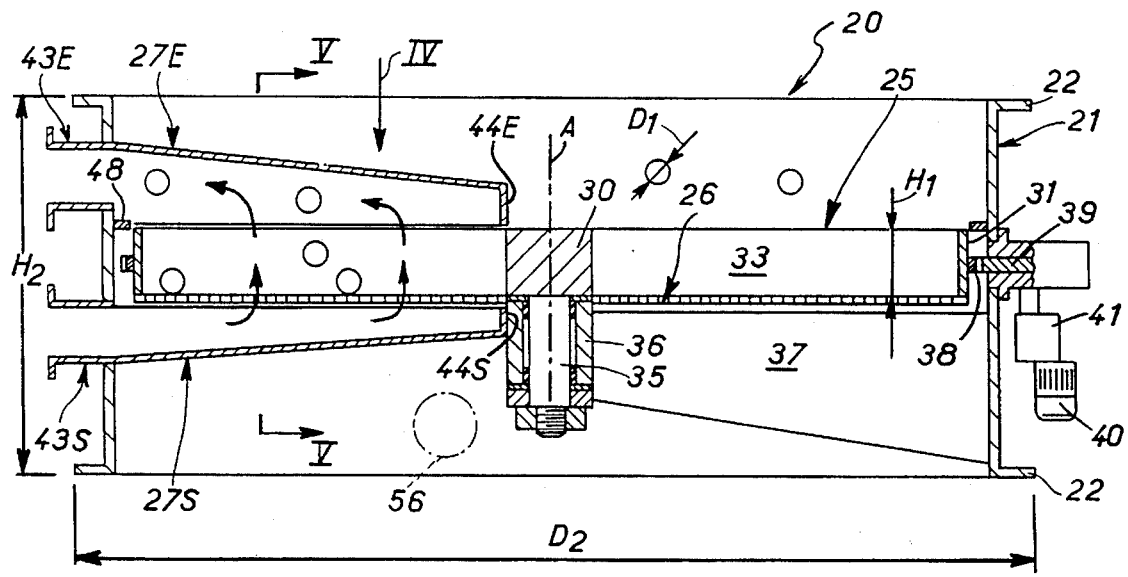
FIG. 3
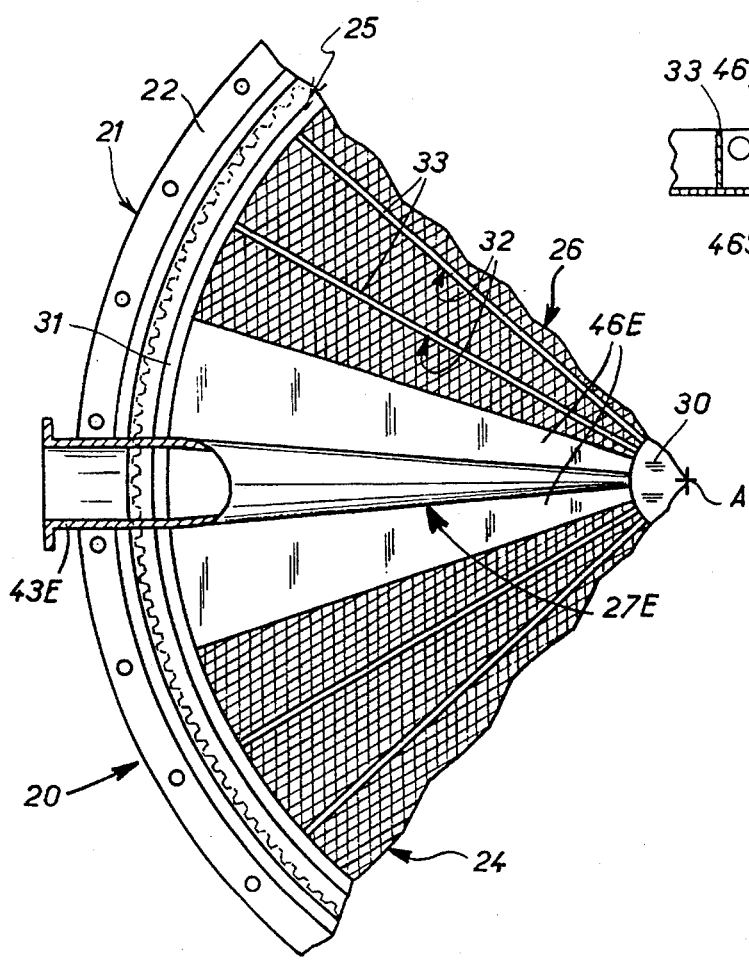
FIG. 4
FIG. 5

5,598,889

DEVICE FOR RECOVERING SOLID CLEANING MATERIALS CIRCULATING THROUGH A HEAT EXCHANGER

FIELD OF THE INVENTION

The present invention concerns heat exchangers, for example tubular heat exchangers forming condensers that are cleaned continuously by so-called solid members as opposed to liquid or fluid cleaning materials, in practise in the form of foam rubber balls, for example, carried in one of the flows concerned. The general principles of such arrangements were disclosed a long time ago in U.S. Pat. No. 1,795,348.

The invention is more particularly directed to the recovery device that has to be provided on the output pipe of the heat exchanger to recover the solid cleaning members there and reinject them into its input pipe.

The recovery device includes filter means in a sleeve and adapted to hold back the solid cleaning members.

BACKGROUND OF THE INVENTION

At present the filter means are usually in the form of two flat grids, implemented in various ways and, in their in service position, closing off the sleeve transversely, together forming within the sleeve a dihedron with the line of intersection perpendicular to its axis and on the downstream side. In practise each grid pivots in the middle about an axis parallel to this line of intersection to occupy one or other of two other positions, namely a cleaning position which is the opposite of their in service position and in which they can be subjected to a washing counterflow, and a neutral position which is a position between the in service position and the cleaning position and in which they are in practise out of service, being aligned with the flow.

To enable the solid cleaning members to roll over them towards gathering means for these members along their line of intersection, the grids are necessarily at a relatively small inclination to the axis of the sleeve in its in service position.

The sleeve is therefore necessarily relatively long in order to accommodate them.

The length is in practise always greater than the diameter of the sleeve, on occasion 1.5 times the latter.

Installing a recovery device equipped with grids of this kind may be difficult, and even prohibitively uneconomic, in particular in some existing installations in which there is only a short length of pipe between the outlet from the heat exchanger and the masonry structure on which the latter rests.

SUMMARY OF THE INVENTION

Given the existence of rotary member filters as described in French patent No 2 609 644 filed 16 Jan. 1987 under application number 87 00430, the present invention consists in a recovery device adapted to gather solid members circulating in a heat exchanger for cleaning the latter that has an advantageously small overall axial dimension, enabling it to be installed in a short length of pipe, whilst having a functional capacity equivalent to that of comparable existing recovery devices combined with other advantages over the latter.

This recovery device, which is of the kind including, in a sleeve adapted to be inserted into the outlet of the heat exchanger, filter means adapted to retain said solid cleaning members, is characterized in that said filter means include a rotary member crossing or closing the sleeve transversely and including an annular filter panel between its axis and its periphery and two pipes on respective sides of the rotary member, one on the downstream side in the direction of the outgoing flow and the other on the upstream side, in corresponding relationship to each other and both facing towards the filter panel of the rotary member, cooperating with rotation of the rotary member relative to the pipes and a circulation assembly adapted to generate locally a counter-current flow through the filter panel of the rotary member at the location of the pipes.

In practise the overall axial dimension of this recovery device usually requires a length of pipe not exceeding one half-diameter.

In practise, the circulation assembly employed, which is needed to drive a counter-current flow through the filter panel of the rotary member from the pipe disposed on the downstream side of the latter to the pipe disposed on the upstream side, overcoming the corresponding head losses, may comprise a pump the discharge side of which is disconnected to the pipe on the downstream side, for example, or, alternatively, may include two pipes of which one is connected to the pipe on the downstream side and the other is connected to the pipe on the upstream side, both being very simply connected to the heat exchanger inlet pipe via an elbow bend, with the elbow bend of the first pipe facing upstream and that of the second pipe facing downstream, so benefiting from the pressure in the inlet pipe.

When a pump is used, it may advantageously be a conventional pump, unlike existing recovery devices in which not only the carrier fluid but also the solid cleaning members conveyed by the latter circulate, and which additionally operate at reduced pressure, so that the equivalent pump is necessarily a special and therefore costly pump.

BRIEF DESCRIPTION OF THE DRAWINGS

The features and advantages of the invention will emerge from the following description given by way of example and with reference to the appended diagrammatic drawings in which:

FIG. 3 is a view of it in axial section on the line III—III in FIG. 2 to a still larger scale;

FIG. 4 is a partial plan view of it as seen in the direction of the arrow IV in FIG. 3;

FIG. 5 is a partial view of it in cross-section on the line V—V in FIG. 3;

DESCRIPTION OF THE PREFERRED EMBODIMENT

Figure 1:
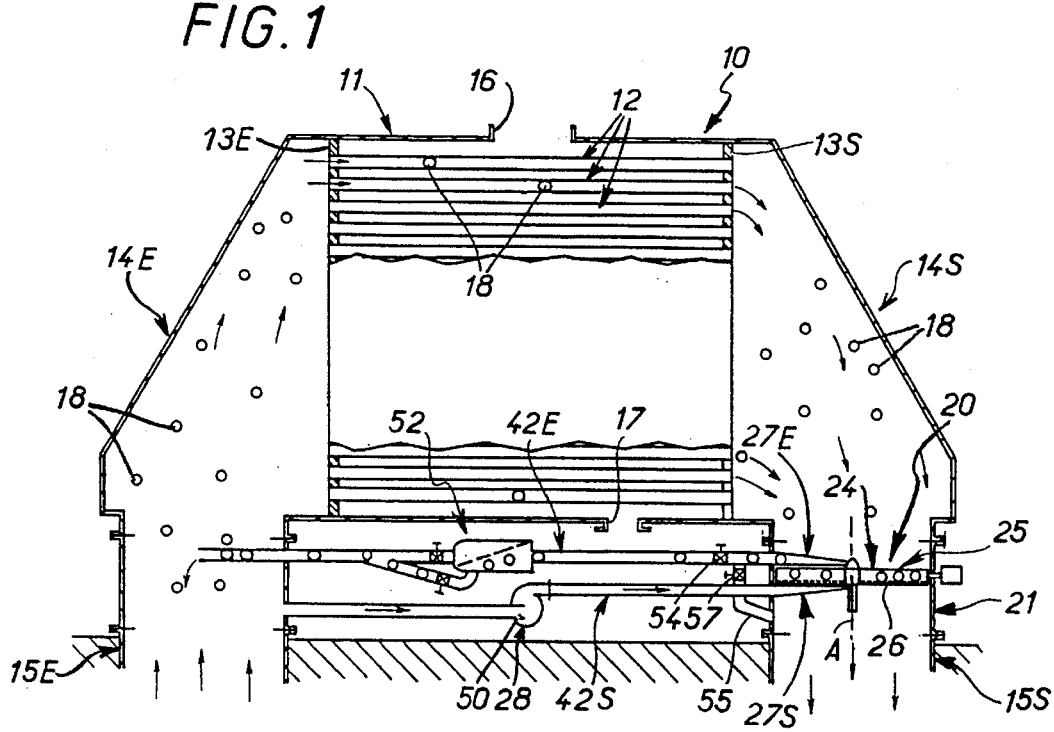
FIG. 1 is a sectional view in elevation of a heat exchanger equipped with a recovery device of the invention.

These figures show by way of example the application of the invention to a tubular heat exchanger 10 forming a condenser.

In the manner that is known in itself, the heat exchanger 10 includes an exchanger body 11 containing a battery of parallel tubes 12 extending from an inlet plate 13E to an outlet plate 13S.

An inlet water box 14E on the upstream side connected to an inlet pipe 15E and an outlet water box 14S on the downstream side connected to an outlet pipe 15S are used to pass a cooling fluid, which is water in this example, through the tubes 12.

The exchanger body 11 has an inlet 16 and an outlet 17 for the fluid to be cooled, which is steam to be condensed in this example.

These provisions are well known in themselves and are not described in more detail here because they are not relevant as such to the present invention.

In the manner that is also known in itself, solid members 18 are systematically circulated in the heat exchanger 10 to clean it, to be more precise to clean the tube 12.

In practise these members are foam rubber balls, the diameter D1 of which is slightly larger than that of the tubes 12 and the density of which, when impregnated with water, is similar to that of the water.

These solid members 18 are systematically injected on the upstream side, into the inlet pipe 15E, and in order to be able to recycle them a recovery device 20 is provided on the outlet pipe 15S.

The recovery device 20 includes, inside a sleeve 21 adapted to be attached by means of flanges 22 to the outlet pipe 15S, filter means 24 adapted to hold back the solid members 18 to be recovered.

In accordance with the invention, the filter means 24 include a rotary member 25 traversing the sleeve 21 transversely and including an annular filter panel 26 between its axis and the rotary member periphery and two pipes 27S, 27E, one on each side of the rotary member 25 that is, one on the downstream side in relation to the direction of the flow through the filter leaving via the outlet pipe 15S and the other on the upstream side. These pipes are in corresponding relationship to each other and both face towards the filter panel 26 of the rotary member 25. As described in more detail below, they cooperate with rotation of the rotary member 25 relative to the pipes 27S, 27E and a circulation assembly 28 adapted to generate a local counter-current flow through the filter panel 26 of the rotary member 25 at the location of the pipes 27S, 27E.

In the embodiments shown, the rotary member 25 is coaxial with the sleeve 21 and rotates therein and the pipes 27S, 27E are fixed in the sleeve 21.

The opposite arrangement is feasible, however.

In the embodiments shown, the rotary member 25 is substantially in the middle of the sleeve 21 and includes a hub 30 extending along the axis A of the sleeve 21 and a rim 31 near the side wall of the latter.

The filter panel 26 extends between the hub 30 and the downstream edge off the rim 31.

In the embodiments shown, the internal volume of the rotary member 25 on the upstream side of the filter panel 26 is subdivided circumferentially into modular and triangular compartments 32 by radial partitions 33. The same height H1 as the hub 30 and the rim 31, these partitions extend continuously from the hub 30 to the rim 31.

The height H1 of the radial partitions 33 is preferably a multiple of the diameter D1 of the solid cleaning members 18.

The height H1 is equal to two or three times the diameter D1, for example.

The number of compartments 32 in the rotary member 25 is preferably relatively high.

In practise it is as high as possible.

It is greater than 30, for example.

By means of a shaft 35 attached to its hub 30, the rotary member 25 rotates in a bush 36 connected by radial arms 37 to the side wall of the sleeve 21.

In the embodiments shown, a ring 38 attached to the rim 31 of the rotary member 25 meshes with a gear 39 outside the sleeve 21 and coupled to the output shaft of a motor 40 via a speed reducer 41.

As an alternative to this, when the rotary member 25 is rotatably mounted in this way, it can be driven by a belt, a chain or rollers, or any other type of drive device as usually employed.

In the embodiments shown, the filter panel 26 is flat and generally perpendicular to the axis of the sleeve 21.

As an alternative to this, it can have a more or less accentuated dome shape, however, for example a generally frustoconical shape.

The filter panel 26 can be of the type described in French patent No 2 609 644, filed 16 Jan. 1987 under application number 87 00430, for example, or that described in French patent No 2 666 027 filed 27 Aug. 1990 under application number 90 10682.

As an alternative to this, the filter panel 26 can be a perforated plate, a cloth made of interwoven or welded wires or a grid made of rods.

In the embodiments shown, the pipe 27S on the downstream side of the rotary member 25 is carried by the side wall of the sleeve 21 and, on the outside of the latter, is connected to a pipe 42S by a flange 43S.

Similarly, the pipe 27E on the upstream side of the rotary member 25 is carried by the side wall of the sleeve 21 and on the outside of the latter is connected to a pipe 42E by a flange 43E.

The two pipes 27S, 27E are globally parallel to each other, projecting cantilever-fashion from the side wall of the sleeve 21, towards the axis A of the latter, and have globally the same gutter-shape configuration with the concave side facing towards the filter panel 26 of the rotary member 25. Seen in plan, they have a triangular contour equivalent to that of at least one of the compartments 32 of the latter.

In the embodiments shown, the pipes 27S, 27E each have in practise a triangular contour as seen in plan view substantially equivalent to only one such compartment 32. At their free end they are closed off by a transverse partition 44S, 44E.

In the embodiments shown, the pipes 27S, 27E are each flanked at each side by deflectors 46S, 46E to prevent the incoming counter-current flow through the filter panel 26 mixing with the outgoing treated flow.

Seen in plan, the deflectors 46S, 46E have a triangular contour equivalent to at least one compartment 32 of the rotary member 25, in practise only one such compartment.

To prevent the outgoing treated flow by passing the rotary member 25, in the embodiments shown a seal 48 carried on the inside of the side wall of the sleeve 21 extends from the immediate vicinity of the upstream edge of the rim 31 of the rotary member 25.

The overall height H2 of the sleeve 21 is less than half its diameter D2.

In the embodiment shown in FIGS. 1 through 5 the circulation assembly 28 includes a pump 50 on the pipe 42S with its discharge side connected via the latter to the pipe 27S on the downstream side of the rotary member 25.

In this embodiment, the inlet side of the pump 50 is connected via the pipe 42S to the inlet pipe 15E of the heat exchanger 10.

As an alternative to this, and at the cost of a minimal reduction in the efficiency of the heat exchanger 10, the inlet side of the pump 50 could equally well be connected to the outlet pipe 15S via the pipe 42S.

The pipe 27E on the upstream side of the rotary member 25 is connected by the pipe 42E to the inlet pipe 15E of the heat exchanger 10. In the manner that is known in itself, the pipe 42E incorporates a collector 52 for gathering up the solid cleaning members 18 if necessary, for example in order to change them.

Finally, in the embodiments shown, a washing pipe 55 is connected to the pipe 42E connected to the pipe 27E on the upstream side of the rotary member 25, on the upstream side of a valve 54 controlling the flow in the pipe 42E. The pipe 55 is connected to the sleeve 21 by a flange 56 and the flow in it is controlled by a valve 57.

In service, the valve 54 is open and the valve 57 is closed.

The filter panel 26 of the rotary member 25 stops the solid cleaning members 18 leaving the outlet water box 14S and, compartment 32 by compartment 32, transports them in succession to the pipes 27S, 27E.

Because of the pressure induced by the circulation assembly 28 there is a counter-current flow through the filter panel 26 at the location of the pipes 27S, 27E. Accordingly, as shown by the arrows F in FIG. 3, the solid cleaning members 18 in the compartment 32 of the rotary member 25 concerned are directed by the pipe 27E towards the pipe 42E connected to the pipe 27E and, via the Latter, to the inlet pipe 15E of the heat exchanger 10, so that they are recirculated by virtue of being injected into this inlet pipe 15E.

If the amount of debris progressively stopped by the filter panel 26 of the rotary member 25 becomes too great, so that the resulting head loss is too great, the filter panel 26 is cleaned.

To do this the solid cleaning members 18 are stopped by the collector 52, the valve 54 is closed and the valve 57 is opened.

The circulation assembly 28 then causes a counter-current flow through the filter panel 26 which removes the accumulated debris via the pipe 27E, the washing pipe 55 and the outlet pipe 15S, in the outgoing flow.

Figure 6:
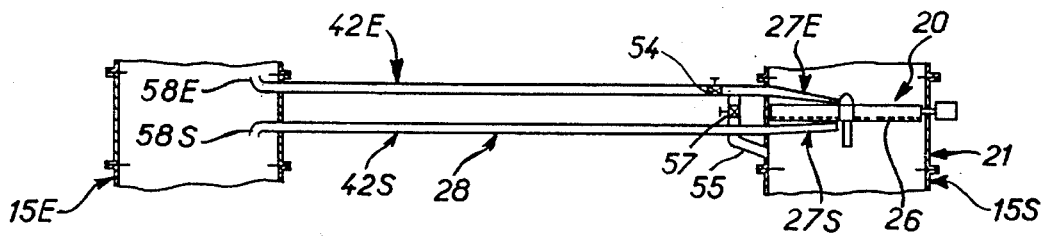
FIG. 6 is a sectional elevation view repeating part of FIG. 1 and relating to a different embodiment.
Figure 2:
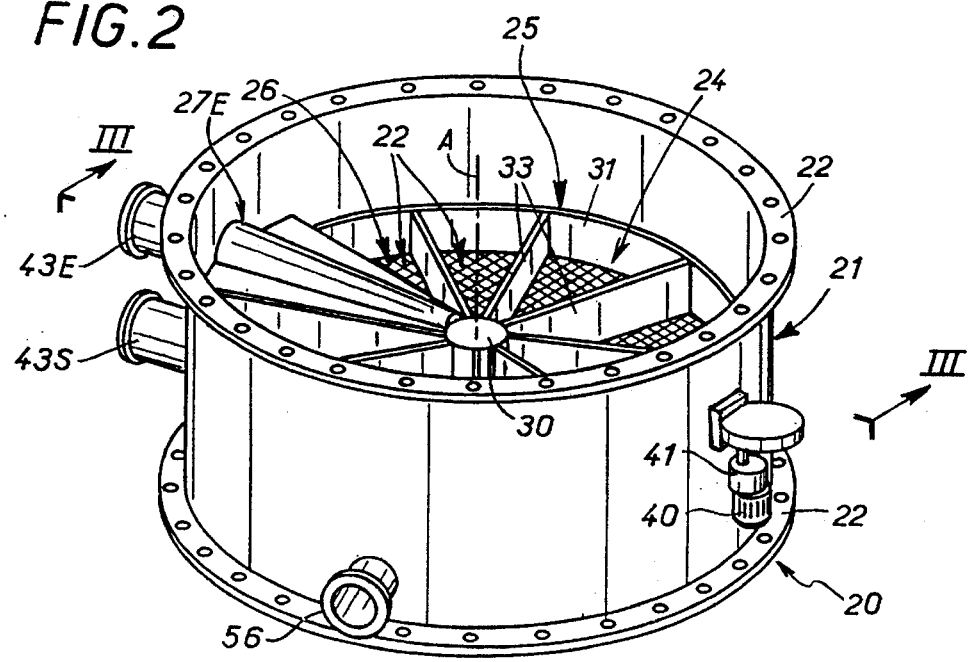
FIG. 2 is a perspective view of the recovery device to a larger scale.

In the embodiment shown in FIG. 6, the circulation assembly 28 simply includes the two pipes 42S, 42E respectively connected to the pipe 27S on the downstream side of the rotary member 25 and to the pipe 27E on the upstream side of the latter and the pipes 42S, 42E are connected by respectively elbow bends 58S, 58E to the inlet pipe 15E of the heat exchanger 10, with the elbow bend 58S of the former facing upstream and that 58E of the latter facing downstream.

The required flow is then obtained in a very simple manner by virtue of the driving force due to the incoming flow.

Of course, the present invention is not limited to the embodiments described as shown but encompasses any variant execution thereof.

I claim:

1. Device for recovering solid cleaning members circulating in a heat exchanger, the recovery device comprising a sleeve to be mounted in a heat exchanger outlet pipe, filter means for retaining the solid members, the filter means including a rotary member extending transversally across the sleeve and including an annular filter panel disposed annularly inside the sleeve, and a first, upstream pipe in communication with an upstream side of the rotary member and a second, downstream pipe communicating with a downstream side of the rotary member, and the first and second pipes being disposed in corresponding relationship with each other, facing the filter panel of the rotary member and cooperable with the rotary member in the course of the rotation thereof, and a circulation assembly for generating local counter-current flow through the filter panel of the rotary member at the location of the first and second pipes.

2. The recovery device according to claim 1 wherein said circulation assembly includes a pump, said pump has a discharge side connected to the second, downstream pipe.

3. The recovery device according to claim 2 wherein said pump having an admission side connected to an inlet pipe for the heat exchanger.

4. The recovery device according to claim 1 wherein the circulation assembly comprises first and second pipe members interconnecting the first, upstream pipe and the second, downstream pipe with an inlet pipe for the heat exchanger, an elbow bend at an end of each of the two pipe members penetrating into the inlet pipe, the elbow bend of the first, upstream pipe facing downstream in the intake pipe, and the elbow bend of the second, downstream pipe facing upstream in the intake pipe.

5. The recovery device according to claim 1 wherein the filter panel on the upstream side of the rotary member being subdivided circumferentially into compartments by radial partitions, and the first and second pipes have triangular contours in plan, the triangular contours substantially corresponding to contours of respective ones of said compartments.

6. The recovery device according to claim 1 wherein the first and second pipes have respective deflectors at sides thereof, the respective deflectors having triangular contours in plan substantially corresponding to contours of respective ones of said compartments.

7. The recovery device according to claim 1 wherein the circulation assembly comprises first and second pipe members interconnecting the first, upstream pipe and the second, downstream pipe with an inlet pipe for the heat exchanger, an elbow bend at an end of each of the two pipe members penetrating into the inlet pipe, the elbow bend of one of the pipes facing downstream in the intake pipe, and the elbow bend of the other pipe facing upstream in the intake pipe.

8. The recovery device according to claim 7 wherein a washing pipe is connected to one of the pipe members, a valve for controlling flow in the first pipe member, the washing pipe being connected to an upstream side of the valve, and downstream side of the rotary member, and another valve for controlling flow in the washing pipe.

9. The recovery device according to claim 1 wherein the rotary member is rotatably mounted in said sleeve and the first and second pipes are fixed therein.

\* \* \* \* \*